(12) United States Patent
Dietl

(10) Patent No.: US 6,910,727 B2
(45) Date of Patent: Jun. 28, 2005

(54) CONVERTIBLE TOP OF A MOTOR VEHICLE WITH A ROOF PART AND A ROOF MODULE WITH SUCH A CONVERTIBLE TOP

(75) Inventor: Rudolf Dietl, Munich (DE)

(73) Assignee: Open Air Systems GmbH, Stockdorf (DE)

(*) Notice: Subject to any disclaimer, the term of this patent is extended or adjusted under 35 U.S.C. 154(b) by 0 days.

(21) Appl. No.: 10/648,326

(22) Filed: Aug. 27, 2003

(65) Prior Publication Data
US 2004/0041435 A1 Mar. 4, 2004

(30) Foreign Application Priority Data
Aug. 28, 2002 (DE) .......................... 102 40 213

(51) Int. Cl.⁷ ................................. B60J 7/00
(52) U.S. Cl. ................................. 296/107.09
(58) Field of Search .............. 296/107.09, 107.11, 296/107.19, 100.11, 100.17, 136.1, 216.01, 218, 219, 216.04, 216.09

(56) References Cited

U.S. PATENT DOCUMENTS

| 4,252,365 A | * | 2/1981 | Ferguson | ............ 296/219 |
| 4,684,419 A | | 8/1987 | Agosta | |
| 2001/0022453 A1 | | 9/2001 | Tucker | |

FOREIGN PATENT DOCUMENTS

| DE | 44 05 356 A1 | 8/1995 |
| GB | 397795 | 8/1933 |

* cited by examiner

Primary Examiner—H. Gutman
(74) Attorney, Agent, or Firm—Nixon, Peabody LLP; David S. Safran

(57) ABSTRACT

A convertible top (1) of a motor vehicle (2) with a roof part (3) which is connected to the material (4) of the convertible top, has at least one mounting element (5) attached on the material (4) of the convertible top. In the installed state of the convertible top 1, the at least one mounting element (5) is detachably connected to at least one corresponding mounting element 6 of the roof part 3.

14 Claims, 3 Drawing Sheets

CONVERTIBLE TOP OF A MOTOR VEHICLE WITH A ROOF PART AND A ROOF MODULE WITH SUCH A CONVERTIBLE TOP

BACKGROUND OF THE INVENTION

1. Field of the Invention

The invention relates to the convertible top of a motor vehicle with a roof part. Furthermore the invention relates to a roof module with a convertible top.

2. Description of Related Art

As the prior art, U.S. Pat. No. 4,684,419 discloses a convertible top for a motor vehicle in which the material of the convertible top is sewn around the edge and a rod-shaped mounting part is held in the resulting depression.

SUMMARY OF THE INVENTION

A primary object of the present invention is to provide a convertible top of a motor vehicle in which the convertible top material is connected to the roof part of the convertible top in an especially variable manner, and to provide a roof module with such a convertible top.

This object is achieved for the convertible top by at least one mounting element being attached to the fabric material, and the at least one mounting element, in an installed state of the convertible top, being detachably connected to at least one corresponding mounting element of the roof part. By means of this detachable connection, the material of the convertible top and the roof part can be prefabricated independently of one another and can be installed in a subsequent step. Furthermore, replacement of the material of the convertible top, for example, for appearance reasons or for reasons of wear is easily enabled.

Thus, the convertible top of the invention has an especially variable structure and enables connection or detachment of the roof part and the material of the convertible top at any time desired by the user.

According to one advantageous embodiment, the convertible top is made as a folding convertible top and can be used in different partially or completely folded open positions.

Advantageously, the mounting element attached to the material of the convertible top is made as a flat element (for example, as an elastic flat component which can be adapted to the curvature of the roof). Here, the mounting element has especially comb-like projections which have clips with depressions for engaging the corresponding mounting element of the roof part.

According to an advantageous embodiment, several mounting elements are attached to the material of the convertible top and are detachably connected to several corresponding mounting elements of the roof part. In such a connection via several mounting elements, an especially stable and secure connection is achieved.

Advantageously, the roof part has at least one recess for passage and accommodation of the mounting element which has been attached to the material of the convertible top. By routing of the mounting element which is attached to the material of the convertible top through the recess of the roof part with form-fitted matching of the recess to the mounting element of the material of the convertible top, further guidance and stabilization of the accommodated mounting element of the material of the convertible top is obtained.

According to another advantageous embodiment, the roof part has a projection around which the material of the convertible top is routed when installed with the roof part, especially for tensioning the material of the convertible top.

The mounting element of the convertible top can be connected via different types of connection to the material of the convertible top, for example via sewing, cementing or thermal bonding. Depending on the respective requirements a suitable type of connection between the mounting element and the material of the convertible top can be chosen.

The roof module for a motor vehicle, according to the invention, comprises a convertible top as described above. In such a roof module which can be inserted into a corresponding roof opening of a motor vehicle, the material of the convertible top can be detachably connected to the roof part of the convertible top. In this way, the material of the convertible top of the roof module can be replaced for appearance reasons or for reasons of wear. Furthermore, the attachment of the material of the convertible top to the roof part of the convertible top is facilitated.

The invention is explained in detail below with reference to representative embodiments shown in the accompanying drawings.

DETAILED DESCRIPTION OF THE INVENTION

Figure 1:
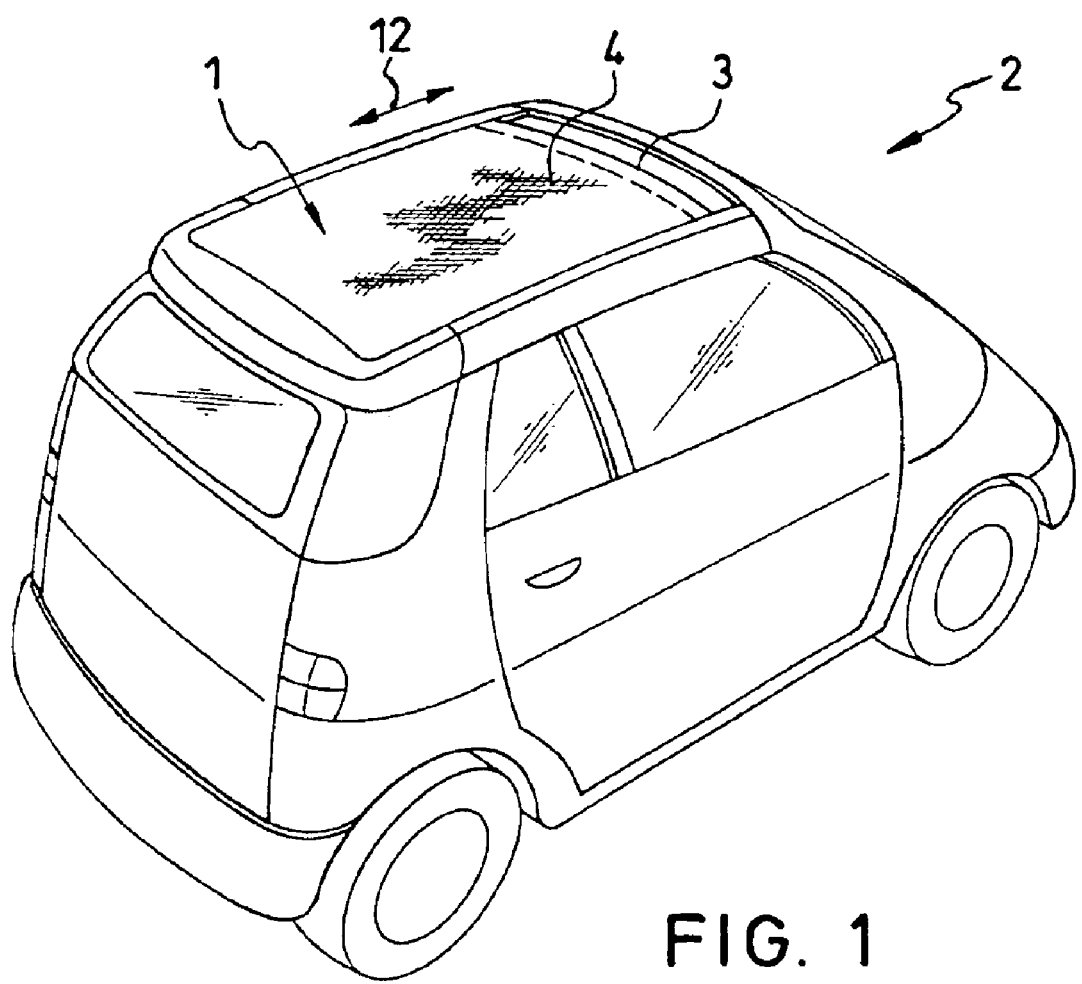
FIG. 1 is a perspective view of a motor vehicle with a partially opened convertible top.

FIG. 1 shows a motor vehicle 2 with a partially-opened convertible top 1 which is made as a folding convertible top. Here, the convertible top 1 has a conventional convertible top frame which can be moved in the direction 12 for opening and closing of the convertible top 1. The convertible top 1 has fabric material 4 which is connected to the front roof part 3 of the convertible top frame (compare also FIG. 3). The roof part 3 is located especially in the front, but also in the side areas of the convertible top 1.

Figure 2:
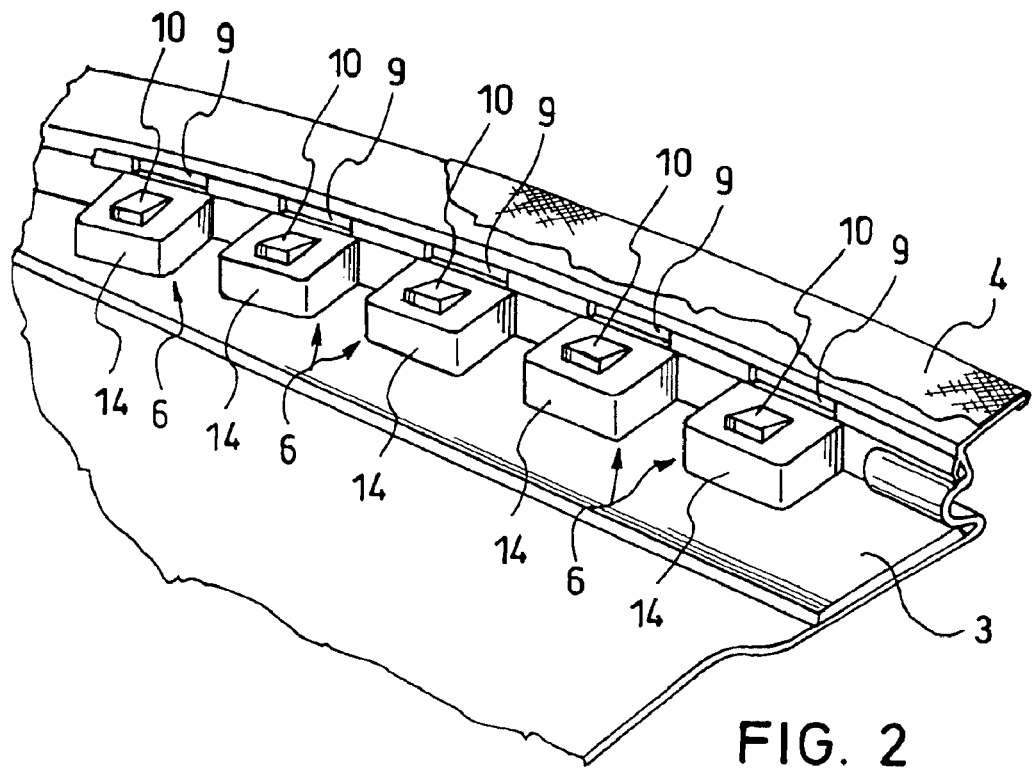
FIG. 2 is a perspective view of the roof part of the convertible top without the material of the convertible top attached.

FIG. 2 shows a representation of the roof part 3 which is made in the manner of a roof peak as the front bow of the convertible top 1. Here, recesses 9 of the roof part 3 and mounting elements 6 of the roof part 3 are shown according to FIG. 3 with resilient catch elements 10 on bases 14 for holding clips 7 of the corresponding mounting elements 5 of the convertible top material.

Figure 3:
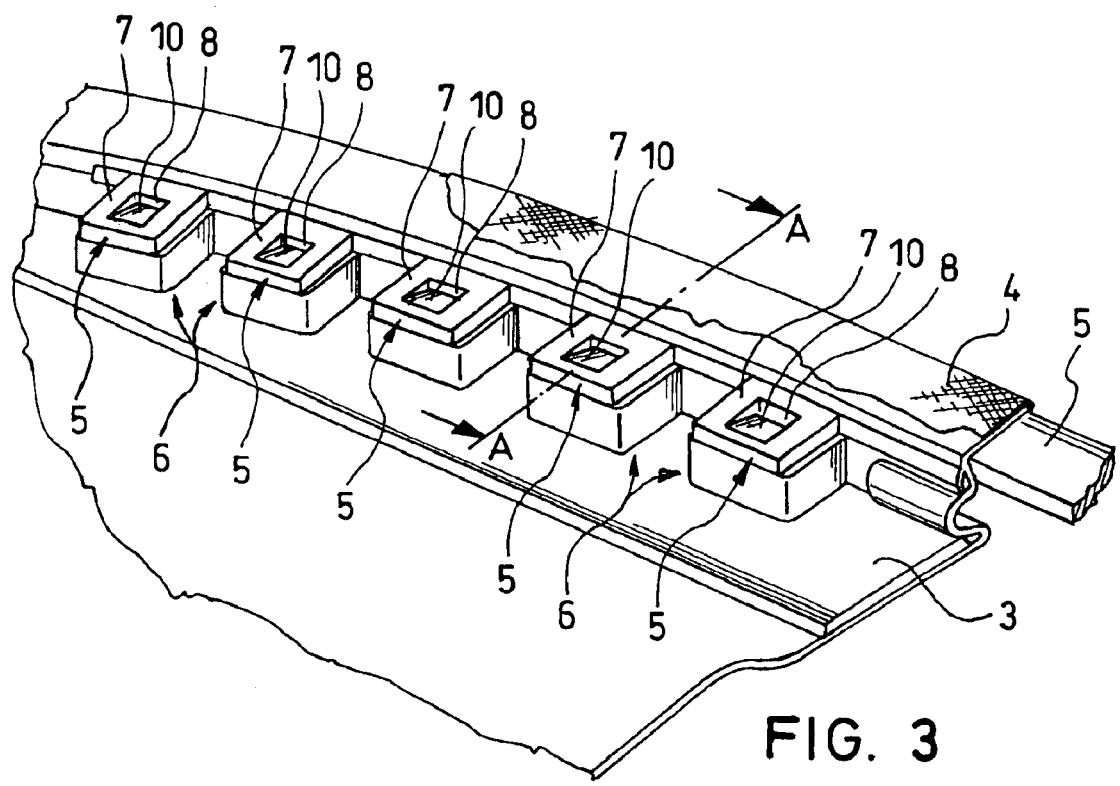
FIG. 3 shows the roof part of the convertible top with the material of the convertible top attached.

In the area of the roof part 3, as shown in FIG. 3, the connection of the material 4 of the convertible top and the roof part 3 is established, in accordance with the invention, via the mounting elements 5 which have been attached to the material 4 of the convertible top and which have clips 7 with openings 8. The mounting elements 5 are guided through the recesses 9 of the roof part 3 with the material 4 of the convertible top attached thereto in order to make a detachable connection to the corresponding mounting elements 6 with the catch elements 10 which fit into the depressions 8.

For dismounting purposes, the connection as shown in FIG. 3 between the mounting elements 5, 6 can be undone by moving the mounting elements 5 in the direction 15 and by subsequently pulling the mounting elements 5 out in the direction 16 (compare FIG. 4).

Figure 4:
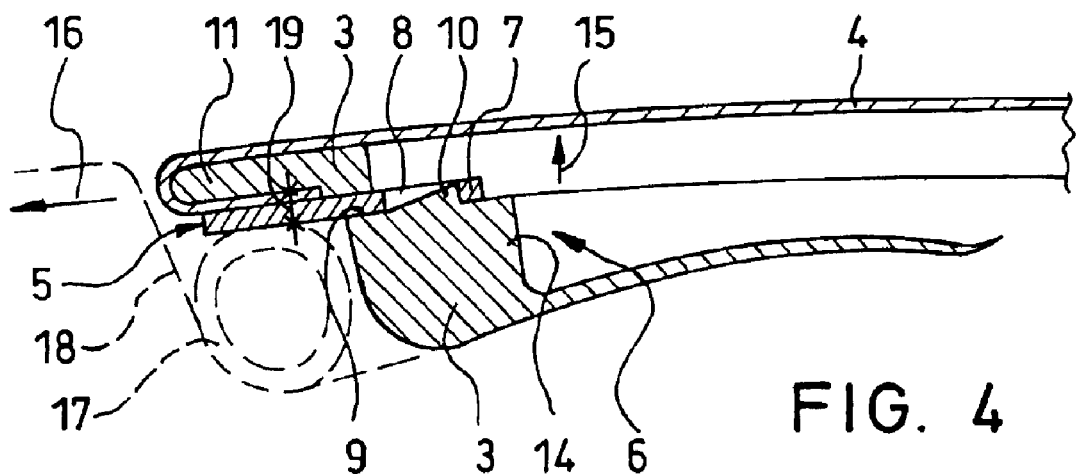
FIG. 4 is a cross-sectional view taken along line A—A in FIG. 3.

FIG. 4 is a view along section line A—A in FIG. 3 showing a mounting element 5 which has been sewn onto the material 4 of the convertible top (seam 19) and which is connected to the corresponding mounting element 6 of the roof part 3 by fitting into the openings 8 of the clips 7 by accommodation of the catch elements 10. Here, the mounting element 5, in the inserted state, is pushed through the recesses 9 of the roof part 3. Furthermore, the material 4 of the convertible top is tensioned around a projection 11 of the roof part 3. The roof part 3 lies on a seal 17 on the peripheral edge 18 of the roof opening of the motor vehicle 2.

Figure 5:
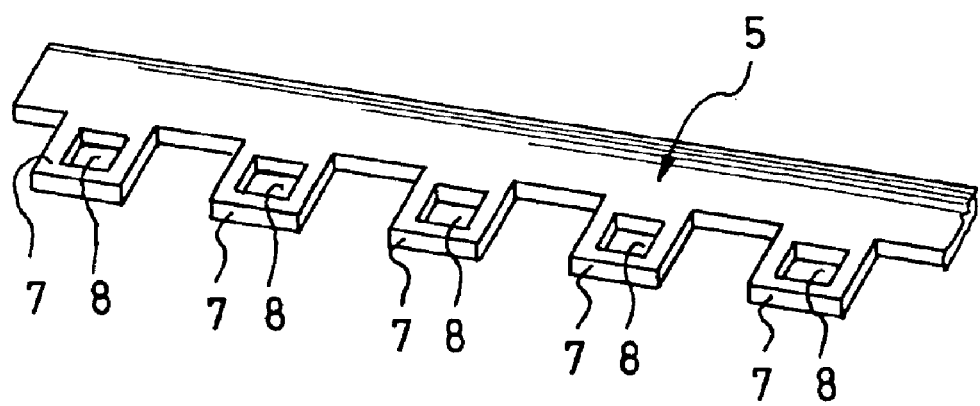
FIG. 5 is a representation of a mounting element which can be attached to the material of the convertible top.

FIG. 5 shows an execution of the mounting element 5 as a comb-like flat element, the comb elements being made as clips 7 with a recess 8. This flat element can be produced as an injection molding or solid polypropylene element.

In the lateral areas of the convertible top 1, conventional fastening of the fabric material 4 of the convertible top can also be produced via pockets which have been sewn around the periphery (not shown).

What is claimed is:

1. Convertible top for attachment to a roof part of a motor vehicle, comprising:
    a fabric material,
    at least one mounting element attached to the fabric material, the at least one mounting element being constructed for detachable connection to at least one corresponding mounting element of the roof part in an installed state of the convertible top;
    wherein both of the mounting element and the corresponding mounting element comprise a comb-shaped flat element, and
    wherein the comb-shaped flat element of the mounting element and the comb-shaped flat element of the corresponding mounting element have clip parts that are interengageable with each other.

2. Convertible top as claimed in claim 1, wherein the convertible top is a folding convertible top.

3. Convertible top as claimed in claim 1, wherein the roof part has at least one recess for passage and accommodation of the mounting element.

4. Convertible top as claimed in claim 1, wherein the fabric material covers a projection of the roof part when attached to the roof part.

5. Convertible top as claimed in claim 1, wherein the mounting element is sewn to said fabric material.

6. Convertible top as claimed in claim 1, wherein the mounting element has been cemented or thermally bonded to the fabric material of the convertible top.

7. Convertible top as claimed in claim 1, wherein the interengageable clips parts comprise openings in the comb-shaped flat element of the mounting element and projections on the comb-shaped flat element of the corresponding mounting element.

8. Roof module of a motor vehicle with a convertible top, comprising:
    a fabric material,
    a roof part,
    at least one mounting element attached to the fabric material, the at least one mounting element being detachably connected to at least one corresponding mounting element of the roof part;
    wherein both of the mounting element and the corresponding mounting element comprise a comb-shaped flat element, and
    wherein the comb-shaped flat element of the mounting element and the comb-shaped flat element of the corresponding mounting element have clip parts that are interengageable with each other 9. Roof module as claimed in claim 8, wherein the convertible top is a folding convertible top.

10. Convertible top as claimed in claim 8, wherein the roof part has at least one recess for passage and accommodation of the mounting element.

11. Convertible top as claimed in claim 8, wherein the fabric material covers a projection of the roof part.

12. Convertible top as claimed in claim 8, wherein the mounting element is sewn to said fabric material.

13. Convertible top as claimed in claim 8, wherein the mounting element has been cemented or thermally bonded to the fabric material of the convertible top.

14. Convertible top as claimed in claim 8, wherein the interengageable clips parts comprise openings in the comb-shaped flat element of the mounting element and projections on the comb-shaped flat element of the corresponding mounting element.

* * * * *